March 9, 1954
G. C. FRICKE
2,671,564
FILTER
Filed Oct. 20, 1949
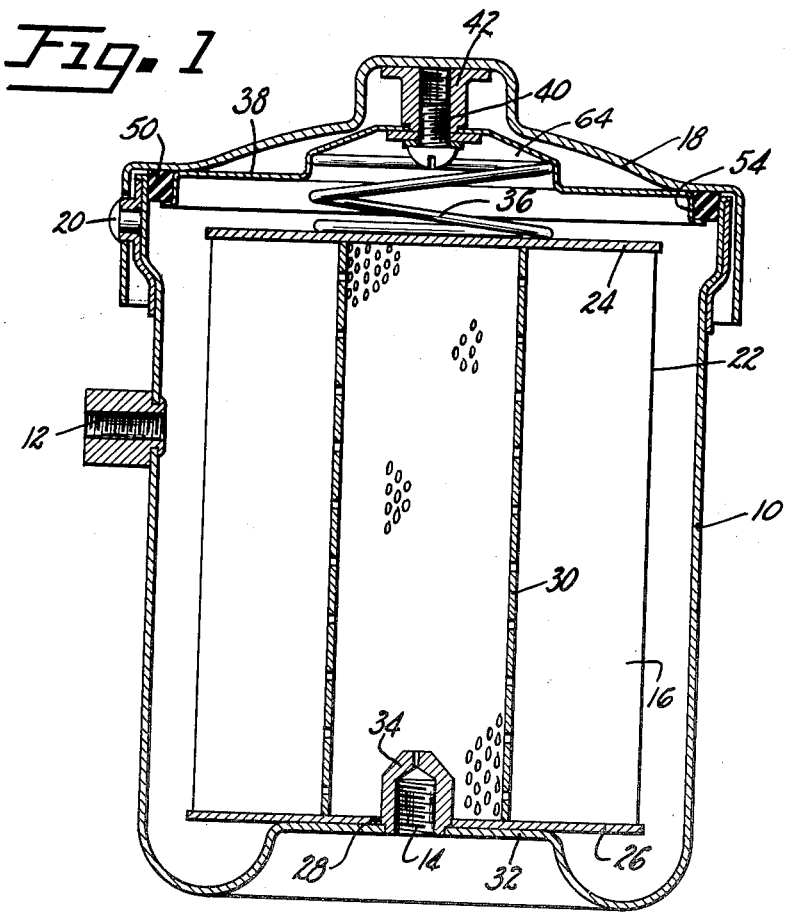
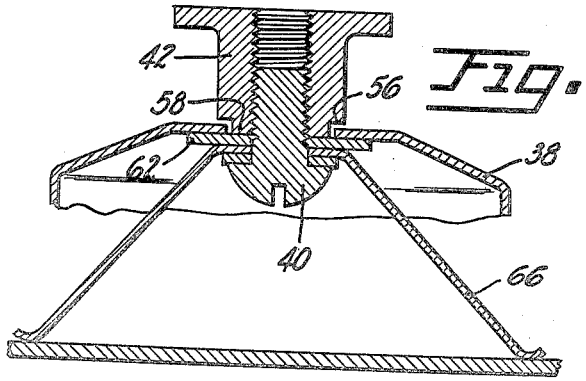
INVENTOR.
GUY C. FRICKE
BY M. A. Hobbs
ATTORNEY Patented Mar. 9, 1954

2,671,564

UNITED STATES PATENT OFFICE 2,671,564

FILTER

Guy C. Fricke, Detroit, Mich., assignor to Bendix Aviation Corporation, South Bend, Ind., a corporation of Delaware Application October 20, 1949, Serial No. 122,517

2 Claims. (Cl. 210—183)

The present invention relates to filters, and more particularly to a cover sealing means for filter containers.

One of the principal objects of the present invention is to provide a cover for filter containers which can readily be applied to containers to effect a dependable seal and thereafter easily removed from the containers.

Another object of the invention is to provide a cover having an inside sealing means for a filter container which requires only moderate top pressure to effect a satisfactory seal and which can easily be assembled, readily replaced, and held firmly in operating position.

Another object of the invention is to provide a filter cover secured to the filter container by relative rotation of the cover and container and having a sealing means which permits sealing of the container and removal of the cover with a minimum of rotational movement by said means.

A further object is to provide, in combination with a cover for a filter container, a relatively simple and dependable means for retaining the filter element in operative position in the filtering device.

Additional objects and advantages of the present invention will become apparent from the following description and accompanying drawing, wherein:

Figure 1 is a vertical cross-section of a filtering device disclosing one embodiment of the invention; and Figure 2 is an enlarged vertical cross-section through an element of the filter cover and also includes a modification of the filter element holding means.

Referring more specifically to the drawing, numeral 10 designates a filter container, 12 a fluid inlet passage, 14 a fluid outlet passage, 16 a filter element mounted over said outlet passage, and 18 a cover for container 10 held thereon by any suitable means, as for example a bayonet-type retaining means as shown in part at numeral 20. The filter element 16, which is only one type of several types suitable for use on the present filtering device, consists of vertically pleated side walls 22 of resinous impregnated paper cemented at the top and bottom to annular plates 24 and 26, respectively, which rigidly hold said element in a cylindrical shape and, except for an outlet port 28 in plate 26, fully seal the two ends of the filter element. A perforated cylinder 30 gives internal support to the pleated side walls and permits the fluid to pass freely from said walls to the fluid outlet passage at the bottom. The element seats on the raised central portion 32 of the container bottom with port 28 in fluid-tight relationship with an outlet projection 34 and is retained in operative position in the filter by a coil spring 36 reacting between top plate 24 and a cage 38 secured to the filter cover by screw 40 and a stud 42 which in turn is secured to the underside of the cover.

The filter cover is sealed to the container by an annular resilient gasket 50 of rubber or rubberlike material adapted to slip snugly into the upper end of the container and form a seal with the inside wall of the container and with the lower surface of the cover. The gasket is held in position during operation of the filter and retained as part of the filter cover assembly when the cover is removed by cage 38, which is provided with an annular flange 54 forming an annular retaining groove for said gasket. As clearly shown in Figure 2, stud 42 is provided with a shoulder 56 and a neck 58 for receiving the cage 38 which is held in place on said stud by a screw 40 and washer 62 seated firmly against the end of said neck. The length of neck 58 is made slightly greater than the thickness of cage 38 so that said cage can rotate freely on the stud after it is assembled in the filter cover. With this arrangement, cage 38 remains fixed in respect to gasket 50 when the cover is placed on and removed from the container. This permits the gasket to be pressed into its sealing position and removed therefrom without any substantial amount of rotational movement and therefore without any substantial relative movement between the inner wall of the container and the periphery of the gasket. With a resilient gasket such as that shown in the drawing, relative movement between the container wall and the gasket causes the gasket to gather at various places and adhere to the wall, thus interfering with the sealing and removing operations of the cover. Cage 38 may readily be removed when gasket 50 is to be replaced by merely removing screw 40 and washer 62. During the operation of the filtering device, the pressure of the fluid on the gasket causes it to seat more firmly against the side walls of the container and the lower side of the cover, assuring a dependable fluid-tight seal.

The spring 36 is seated in a recess 64 of cage 38 and is held therein by a close fit between the spring and the side walls of the recess so that the spring and cover are removed from the filter container as a unit.

Although only one embodiment of the invention is described herein and shown in the accompanying drawing, modifications may be made to suit requirements without departing from the scope of the invention. For example, a leaf spring 66 such as that shown in Figure 2 may be substituted for the coil spring 36 shown in Figure 1. In this embodiment, the leaf spring is secured to the cover and held in place by screw 40.

I claim:

1. A filtering device comprising a container having an open end, a fluid inlet passage for said container, a fluid outlet passage for said container in the bottom thereof, a filter element interposed between said inlet and outlet passages seated over said outlet passage, a cover for said container, a leaf spring member adapted to hold said filter element in operative position, a disc-shaped member having a circumferential groove adjacent the wall of said container, a gasket in said groove adapted to seat on the inside surface of the cover and container wall, and a means for rigidly securing said spring member and loosely securing said disc-shaped member to the lower side of said cover.

2. A filtering device comprising a container having an open end, a fluid inlet passage for said container, a fluid outlet passage for said container in the bottom thereof, a raised flat portion in said bottom surrounding said outlet, a filter element interposed between said inlet and outlet passages seated around said outlet passage and on said flat portion, a cover for said container requiring relative rotation between said cover and container to secure the cover in place, an annular gasket adapted to seat against the inside wall of the container, a disc-shaped member disposed between said cover and element and having a peripheral flange thereon for engaging said gasket, and a spring means between said disc-shaped member and the upper end of said filter element for holding said filter element in operative position.

GUY C. FRICKE.

References Cited in the file of this patent

UNITED STATES PATENTS

| Number | Name | Date |
|---|---|---|
| 303,558 | Campbell | Aug. 12, 1884 |
| 1,133,289 | Keithline | Mar. 30, 1915 |
| 1,176,463 | Kimmel | Mar. 21, 1916 |
| 1,243,974 | Powers et al. | Oct. 23, 1917 |
| 2,081,968 | Wicks et al. | June 1, 1937 |
| 2,284,447 | Redner | May 26, 1942 |
| 2,294,261 | Wilkinson | Aug. 25, 1942 |
| 2,320,725 | Hautzenroeder | June 1, 1943 |
| 2,325,399 | Houston | July 27, 1943 |
| 2,342,948 | Long | Feb. 29, 1944 |
| 2,354,481 | Russell | July 25, 1944 |
| 2,436,566 | Goldberg | Feb. 24, 1948 |
| 2,488,796 | Baier | Nov. 22, 1949 |
| 2,512,041 | Steele | June 20, 1950 |
| 2,525,330 | Zaun | Oct. 10, 1950 |